United States Patent [19]
Ross

[11] Patent Number: 5,294,080
[45] Date of Patent: Mar. 15, 1994

[54] LIFT ENHANCING TABS FOR AIRFOILS

[75] Inventor: James C. Ross, Oakland, Calif.

[73] Assignee: The United States of America as represented by the Administrator of National Aeronautics and Space Administration, Washington, D.C.

[21] Appl. No.: 14,581

[22] Filed: Feb. 8, 1993

[51] Int. Cl.⁵ .................................................. B64C 9/16
[52] U.S. Cl. ..................................... 244/215; 244/216
[58] Field of Search ............................... 244/213-216, 244/201, 204

[56] References Cited

U.S. PATENT DOCUMENTS

| | | | |
|---|---|---|---|
| 3,126,173 | 3/1964 | Alvarez-Calderon | 244/216 |
| 3,371,888 | 3/1968 | Alverez-Calderon | 244/213 |
| 3,767,140 | 10/1973 | Johnson | 244/213 |
| 4,039,161 | 8/1977 | Bauer | 244/213 |
| 4,117,996 | 10/1978 | Sherman | . |
| 4,542,868 | 9/1985 | Boyd | . |
| 4,702,441 | 10/1987 | Wang | 244/213 |
| 4,796,840 | 1/1989 | Heynatz | 244/213 |

FOREIGN PATENT DOCUMENTS

| | | | |
|---|---|---|---|
| 0230061 | 7/1987 | European Pat. Off. | . |
| 2253877 | 6/1973 | Fed. Rep. of Germany | 244/213 |
| 51663 | 3/1943 | France | 244/216 |
| 11205 | of 1911 | United Kingdom | . |
| 496522 | 12/1938 | United Kingdom | 244/216 |

*Primary Examiner*—Galen L. Barefoot
*Attorney, Agent, or Firm*—Darrell G. Brekke; Guy Miller; John R. Manning

[57] ABSTRACT

A tab deployable from the trailing edge of a main airfoil element forces flow onto a following airfoil element, such as a flap, to keep the flow attached and thus enhance lift. For aircraft wings with high lift systems that include leading edge slats, the slats may also be provided with tabs to turn the flow onto the following main element.

13 Claims, 4 Drawing Sheets

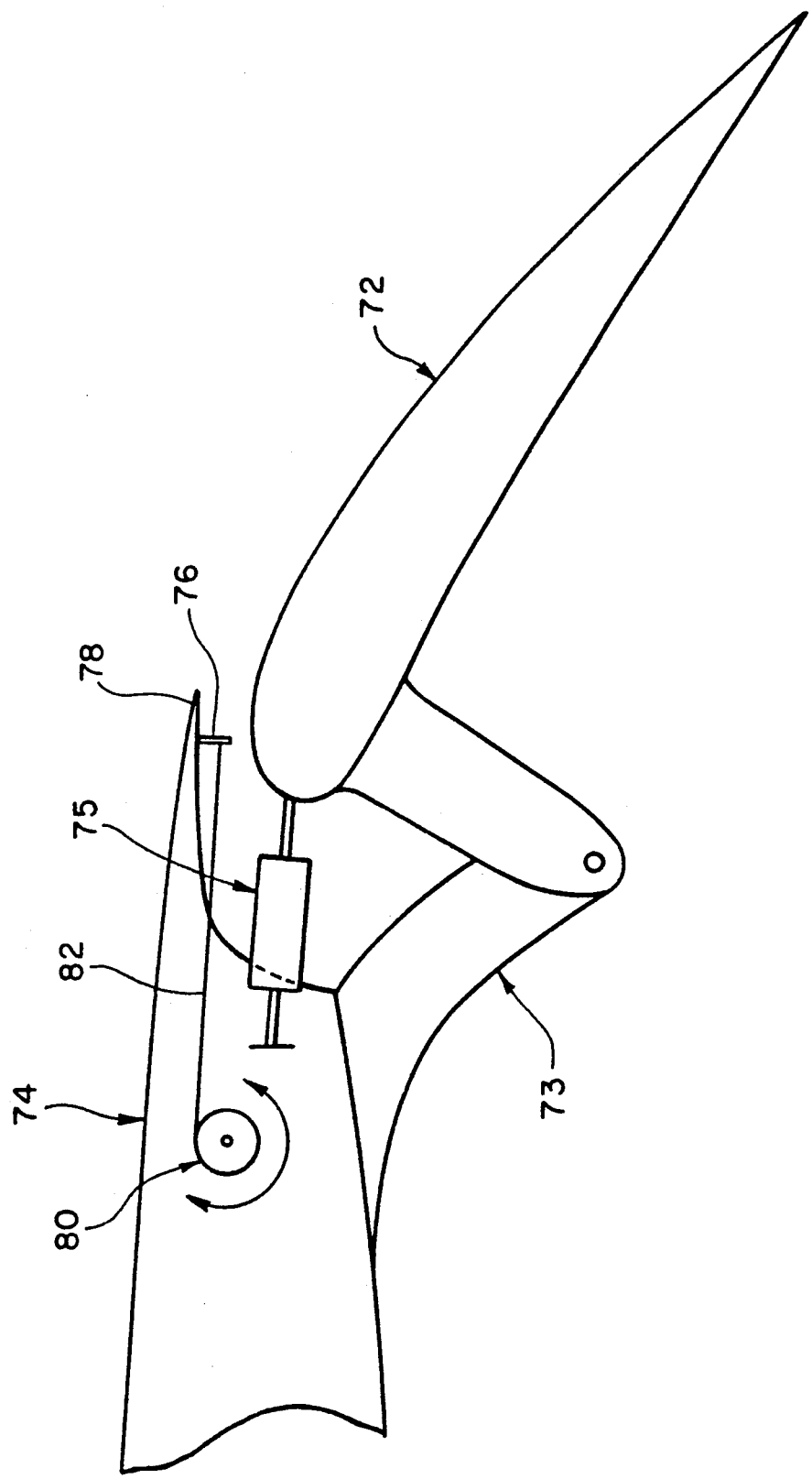

LIFT ENHANCING TABS FOR AIRFOILS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The present invention relates generally to the field of aerodynamics and, more specifically, to a lift enhancing tab capable of increasing the maximum lift capability and reducing drag at high-lift conditions for airfoils employing multi-element flap systems. The tab is placed near the trailing edge of the cove of a multi-element airfoil and is nominally perpendicular to the lower surface of the airfoil, and forces the airflow leaving the trailing edge to turn toward the following wing element.

TECHNICAL FIELD OF THE INVENTION

Flaps are control surfaces that are mounted at the trailing edge of the wing. Lowering the trailing edge flaps adds to the effective area and camber of the wing so that it develops more lift at low speeds. The small airflow through the gap formed between the flap and the wing allows the wing/flap combination to generate a large amount of lift by delaying flow separation. Leading edge flaps or slotted slat elements are often used to increase the effective wing camber even further.

For fixed wing aircraft, numerous flap deployment structures have been developed to generate high lift during take-off and landing, for example. Currently, the slotted trailing-edge flap, employing single or multiple slots, is the most common high lift device found on airplanes. It is not uncommon for leading-edge slotted slat elements or leading edge flaps to be used in conjunction with slotted trailing-edge flaps. Proper placement and shaping of the different leading- and trailing-edge flap and/or slat elements can produce a wing with a high-lift system that can generate large maximum lift and acceptably low drag.

Various means have been considered for increasing or enhancing the lift capability of an airfoil. Several employ boundary layer control to maintain attached flow on the trailing-edge flaps. Both jet blowing and moving surface boundary layer control techniques have been employed effectively. For example, see J. A. Chochrane et al., "Selected Results From the Quiet Short-Haul Research Aircraft Flight Research Program", *Journal of Aircraft*, Vol. 19, no. 12, December 1982, pp. 1076–1082.

The aforementioned boundary layer control techniques have the disadvantage of not being passive, in that they rely upon some source of power to maintain attached flow on the flaps. This reliance on external power leads to complex power delivery systems, particularly for moving surface systems (generally a rotating cylinder at the flap hinge). Moreover, the blowing type of boundary layer control is not as mechanically complex as the moving surface type but suffers from the common inability to maintain high lift capability in the event of loss of power. Degradation in the performance of a high lift system in the event of power loss places the aircraft in great jeopardy and is typically not an acceptable risk for civilian aircraft.

Vortex generators have also been used to increase flap effectiveness for high lift. The most successful approach has been to place small vortex generators on the upper surface of the flap element. The vortices energize the boundary layer on the upper surface of the flap, thereby causing the flow on the flap to remain attached at larger flap deflections than is the case without the vortex generators.

The aforementioned vortex generator concept has merit in that it is passive. Vortex generators produce drag, however, so whenever the flaps are deployed the vortex generators increase the drag of the aircraft. This is not significant when extremely high lift is desired, such as for landing, but for moderate lift conditions, as during take-off and climb out, this additional drag can be significant. Making the vortex generators deployable on the flap surface adds significant complexity and makes them much less attractive.

Gurney flaps have also been used to enhance airfoil performance. Generally, a Gurney flap is a small tab, typically 1% to 2% of the airfoil chord, located on the lower surface (pressure side) at the trailing edge of the wing or airfoil. They are usually always placed only on the aft-most element of the airfoil, and normally perpendicular to the airfoil surface.

The most common use of a Gurney flap is in automobile racing. Wings are placed on many types of racing cars in order to produce a large downward force so that the tires do not lose traction around high-speed corners. The drag was found to increase significantly if the flap was larger than about 1.5% of the airfoil chord. Functionally, the Gurney flap modifies the exit angle of the flow at the wing trailing edge. Increasing the downward exit angle relative to the wing mean chord line increases the lift.

The gurney flap is effective in increasing lift when used on the trailing edge of a single element airfoil and on the trailing edge of the last flap element of a multi-element wing. It has limitations in that it is located at the trailing edge which is generally very thin. This location does not lend itself to a deployable device since the required hinge and actuation mechanisms would dictate a thicker trailing edge than is desirable. An aircraft high lift system must be stowed or retracted when not needed. This is important since the high lift system is used only during take-off and landing and not during the majority of a typical flight.

Currently used flap systems have strong sensitivity to Reynolds number and hence to the details of the arrangement of the various elements, particularly the gaps between the elements. A great deal of experimental validation of the performance of a system is necessary before it is incorporated into a new airplane. Since high Reynolds number testing is difficult to perform and very expensive, the many hours of high lift testing performed on new aircraft configurations is generally done with small models and low Reynolds numbers rather than at actual flight conditions. As a result, high lift systems often do not perform as expected on the actual aircraft because small differences in Reynolds number often makes a large difference in the performance of a particular high lift system.

In order to generate large lift coefficients, aircraft designers often use multiple slotted flaps and significant amounts of Fowler action on the flaps. Fowler action is a large aft translation of a flap element as it is deployed.

This action adds some effective area to the wing planform during high lift operations, thus increasing lift. The mechanical systems required to perform this function are complex and are generally placed inside large fairings on the lower surface of the wing. These fairings cause a significant increase in the drag incurred during cruise flight. The fairings become larger as more flap elements are added to the high lift system. Design, manufacturing, and maintenance of complex flap systems increases both the initial cost of an aircraft and the maintenance costs.

Thus, a continuing need exists for devices which increase the maximum lift capability and reduce the drag at high lift conditions for airfoils employing multi-element flap systems.

SUMMARY OF THE INVENTION

An object of the present invention is to provide a device for enhancing lift of an aircraft wing which is relatively simple in construction and compact.

Another object of the present invention is to provide a device for enhancing lift of an aircraft wing which renders the high lift system of the wing less sensitive to Reynolds number.

Still another object of the present invention is to provide a device for enhancing lift of an aircraft wing which is more passive than prior techniques, thus providing easier operation and control.

These and other objects of the invention are met by providing a device for enhancing lift of an aircraft wing having a fixed main element which includes a leading edge and a trailing edge, and at least one movable element deployable from one or both of the leading edge and the trailing edge of the fixed main element and having a leading edge and a trailing edge, the device comprising means, deployable from one of the fixed main element and the movable element, for forcing airflow leaving the trailing edge of one of the fixed main element and the movable element to turn towards the other of the fixed main element and the movable element, thereby maintaining attached flow and enhancing lift of the wing.

Another aspect of the present invention is to provide an aircraft wing having a high lift system of the type described above and employing the forcing means also described above. In either case, the forcing means is preferably a tab having a height typically on the order of 1% of the chord length of the airfoil element on which it is installed.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

FIG. 10 is a side elevational view of a tab actuator according to the present invention.

DETAILED DESCRIPTION OF THE INVENTION

Figure 1A:
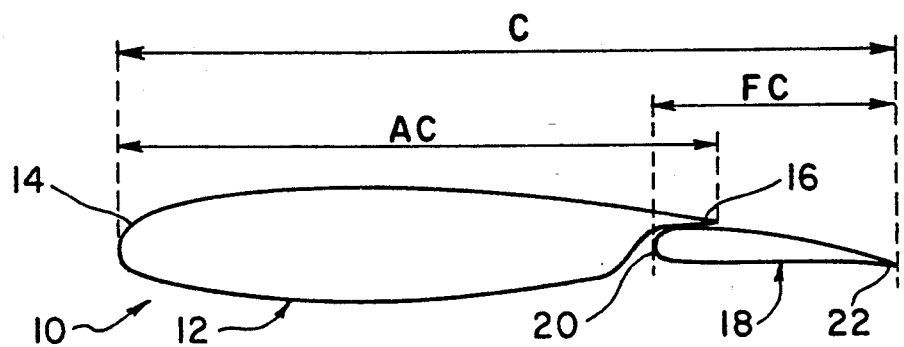
FIG. 1(a) is a schematic side elevational view of a wing employing the device for enhancing lift according to a preferred embodiment of the present invention, and showing a trailing edge flap in the non-deployed position.
Figure 1B:
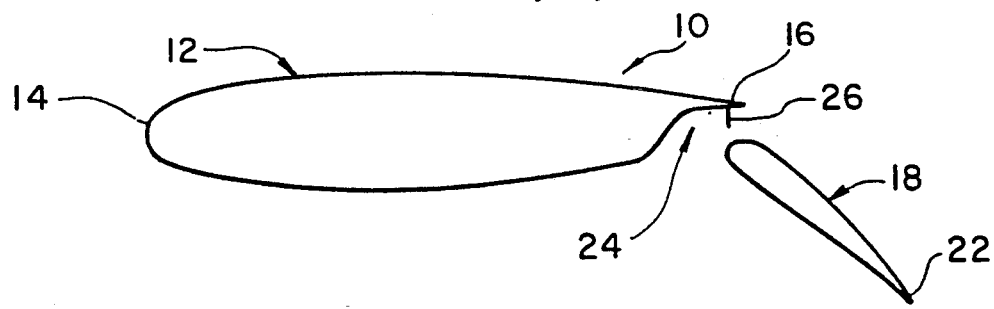
FIG. 1(b) is a schematic side elevational view of the wing of FIG. 1, with the flap in the deployed position.
Figure 2:
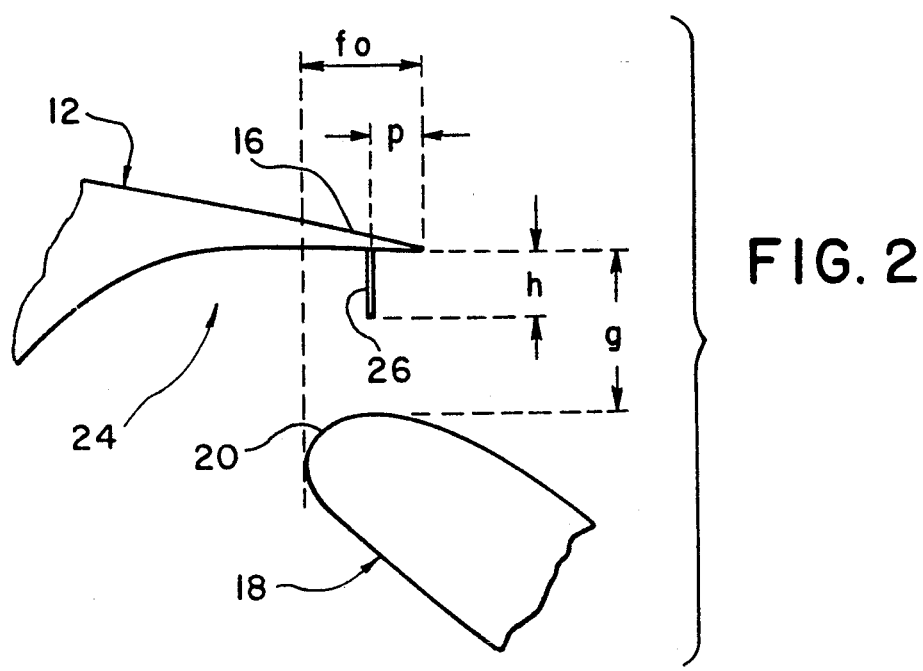
FIG. 2 is an enlarged view of the cove between the trailing edge of the wing element and the flap element illustrated in FIGS. 1(a) and 1(b)

Referring initially to FIGS. 1(a), 1(b) and 2, a device for enhancing lift of an aircraft wing 10 is shown schematically. The wing 10 is of the type having a high lift system, and includes a fixed main element 12 which includes a leading edge 14 and a trailing edge 16. A movable element 18 also has an leading edge 20 and a trailing edge 22, and is deployable from a cove 24 formed in the trailing edge portion of the fixed main element 12.

A tab 26 is deployable from the fixed main element 12 from the cove 24 near the trailing edge 16. The tab 26, when deployed as shown in FIGS. 1(b) and 2, forces airflow leaving the trailing edge 16 of the fixed main element 12 to turn towards the movable element 18, thereby maintaining attached flow and enhancing lift of the wing 10. The movable element 18 in the illustrated embodiment is a single-slotted flap. The height "h" of the tab 26 is typically on the order of 1% of the chord length ("AC" for the main element 12 and "FC" for the movable element 18) of the airfoil element on which it is installed, although this dimension can be varied to suit particular applications. Generally, the height h is selected to be sufficient to provide adequate turning of the airflow onto the following airfoil element to keep the airflow attached. By including lift enhancing tabs into a high-lift system design, the flap deflection angle may be increased over what is possible without the tab 26.

Typically, tabs 26 are provided for each movable element 12 of a wing, and each tab preferably extends for the length of the corresponding movable element. Any suitable attachment means may be provided, such as a hinge, for pivotally or otherwise movably mounting the tab 26 on the movable element 18. Moreover, any suitable actuators may be provided for moving the tab 26 from a stowed position recessed within the cove 24 to an operable position in which the tab 26 is nominally perpendicular to the underside surface of the cove 24.

A test was conducted using a model wing having a hinged flap which had a chord length (FC) equal to 30% of the overall airfoil chord ("c"), as seen in FIG. 1. The first configuration tested had the flap 18 (the movable element) set so as to create a flap gap ("g") to flap chord ratio of 0.052 and a flap overlap ("fo") to chord ratio of 0.035. The flap was deflected downwardly at 42.5° from its retracted orientation. Both the height h and the location of the tab could be adjusted for the test. Typical variations in the height were from 0.5% to 1% of the airfoil chord AC. The position ("p"—corresponding to the distance of the tab from the trailing edge of the flap) of the tab was varied from the trailing edge of the main element to a location that is 1.5% of the airfoil chord ahead of the trailing edge.

Figure 3:
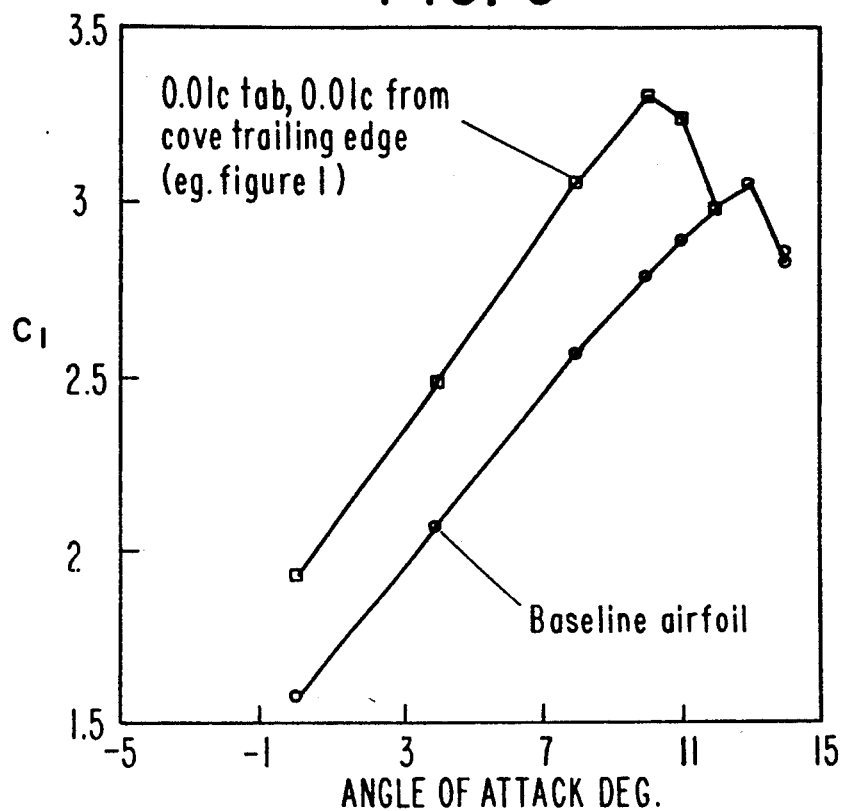
FIGS. 3 and 4 are graphs showing the effectiveness of a lift-enhancing tab placed 1% of the airfoil chord AC ahead of the trailing edge of the cove.
Figure 4:
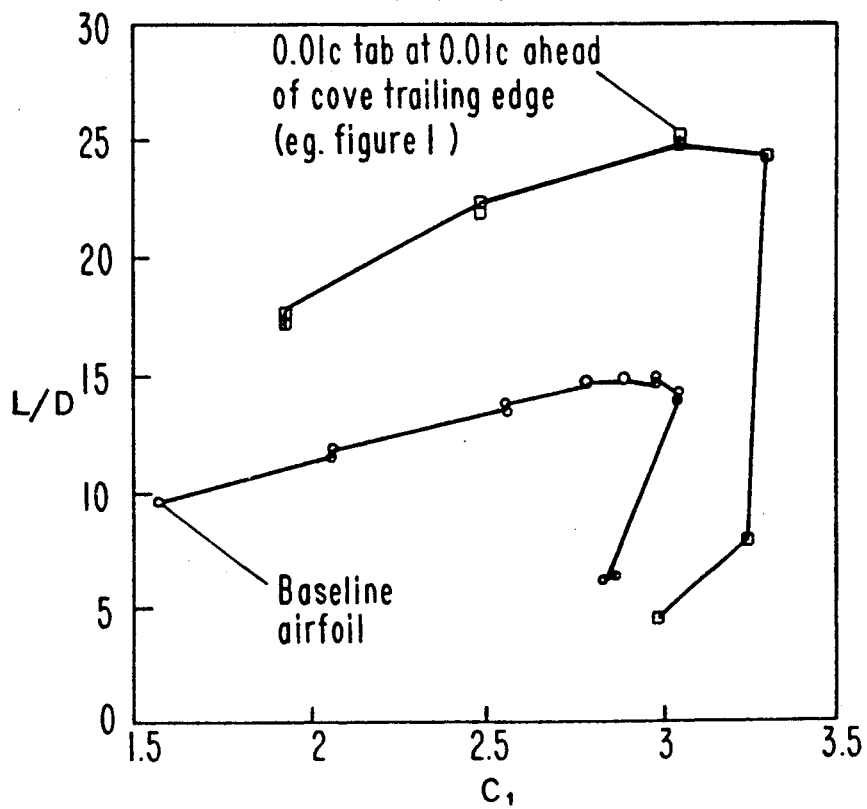

Preliminary results showing the effectiveness of a lift-enhancing tab placed 1% of the airfoil chord c ahead of the trailing edge of the cove are shown in FIGS. 3 and 4. The tab significantly increases the lift at a given angle of attack. The lift increment is equivalent to a 3.5° shift in the lift versus angle of attack curve. The lift-enhancing tab increases the maximum lift coefficient of the airfoil by more than 8% as well.

The lift-enhancing tab had an even greater effect on the lift-to-drag ratio (L/D), as seen in FIG. 4. The tab increased the maximum L/D by approximately 40%. The reduced drag is due to an increase in the amount of attached flow on the upper surface of the flap. The presence of the lift-enhancing tab in the cove delayed separation on the flap to about 20% of the flap chord FC compared with 5% without the tab. The delayed separation also increased the lift carried by the flap.

Figure 5:
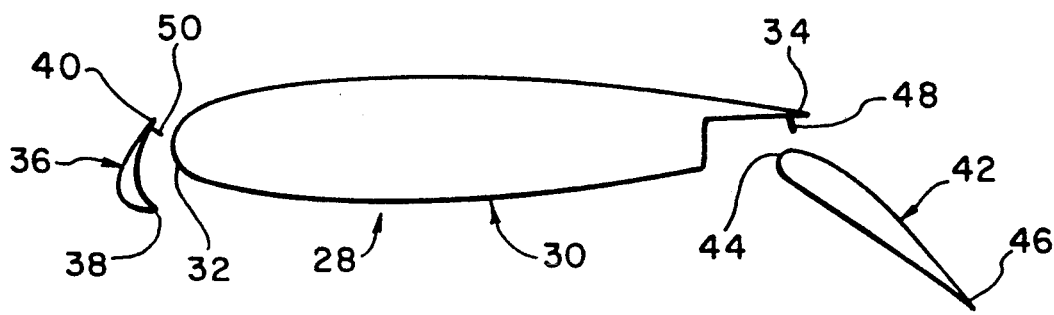
FIG. 5 is a schematic side elevational view of a wing employing the device for enhancing lift according to another embodiment of the present invention.

FIG. 5 illustrates another embodiment in which the wing 28 has a main element 30 having a leading edge 32 and a trailing edge 34, a forward movable element 36, also known as a "slat", having a leading edge 38 and a trailing edge 40, and a rearward movable element 42 or "flap" having a leading edge 44 and a trailing edge 46. A lift-enhancing tab 48 located in the cove of the main element 30 is deployable into the operative position illustrated in FIG. 5. Similarly, a lift-enhancing tab 50 is deployable into the operative position from a cove formed in the slat 36. With the three element configuration of FIG. 5, the slat can be deflected to a more nose-down position. This allows the three element airfoil to operate a higher lift coefficient than would be the case without the tab on the slat.

According to the present invention, the lift-enhancing tabs can be provided on either or both of the movable elements. When the aircraft is in cruise flight and the high-lift system is stowed, the tab 48 is simply retracted to make room for the flap 42 to nest in the cove. Activation of the tab is easily accomplished since it can be located upstream of the trailing edge where hinge and actuation hardware do not affect the trailing edge geometry, particularly if the tab retracts in the forward direction.

Figure 6:
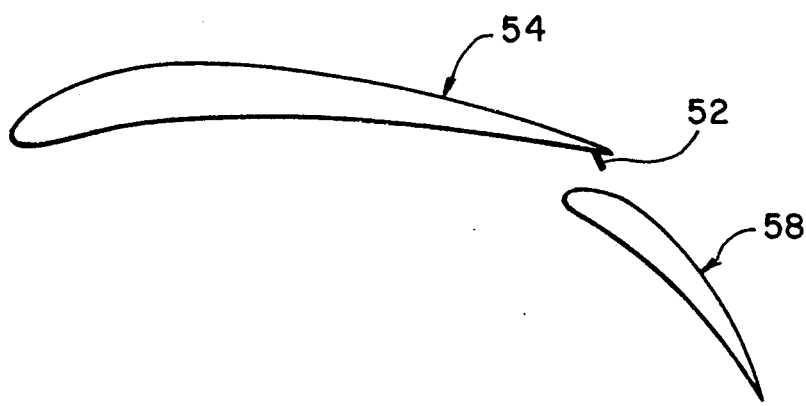
FIG. 6 is a schematic side elevational view of a wing employing the device for enhancing lift according to another embodiment of the present invention.
Figure 7:
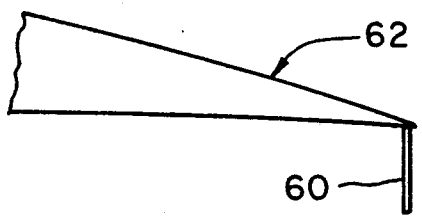
FIGS. 7-9 are schematic side elevational views of different embodiments of lift enhancing tabs according to the present invention.
Figure 8:
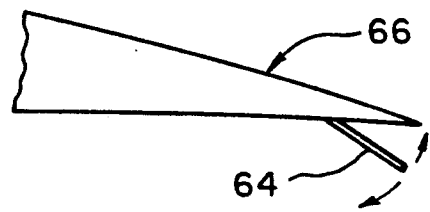
Figure 9:
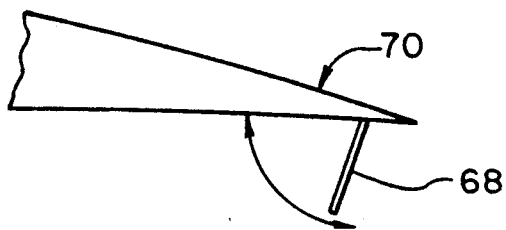

Other variations of the present invention are illustrated in FIGS. 6–10. FIG. 6 illustrates an application of the cove tab 52 to the main element 54 of a wing 56 also having a flap or movable element 58. In this embodiment, the main element 54 has no distinctive cove into which the flap 58 is retracted. Thus, the presence of a cove is not necessary for operation of the present invention. FIG. 7 illustrates a tab 60 near the trailing edge of the main element 62 in a preferred perpendicular orientation. FIG. 8 illustrates a tab 64 angled acutely aft relative to a lower surface of the main element 66. FIG. 9 illustrates a tab 68 spaced inwardly of the trailing edge of the main element 70 and having a range of pivotal movement indicated by the arcuate directional arrow. In the various embodiments of FIGS. 7-9, the tabs illustrated could have been provided on the movable elements of a wing structure employing a high lift system.

FIG. 10 illustrates a typical flap element 72 movably connected to an airfoil or wing element 74 through an external hinge 73. A linear actuator 75, such as a hydraulic cylinder with an extensible arm, moves the flap element 72 into and out of deployment. Other deployment systems could be used, such as the conventional Fowler flap track systems used on most commercial transport aircraft.

A lift enhancing tab 76 is pivotally connected to the wing element near a trailing edge 78 and is normally retracted into the lower surface of the wing 74. Any suitable pivotal connecting means, including a piano hinge, could be used to connect the tab 76 to the wing element 74. The tab 76 extends for a length and height sufficient to effect the desired aerodynamic effect. Typically, the length (measured in the direction of the wing element) corresponds substantially to the length of the flap element 72, although greater and lesser lengths can be employed depending on the type of aircraft.

Typically, the A rotary actuator 80 is rotatable in either of two directions, as indicated by the arcuate directional arrow, by any suitable motor means. A steel cable 82 retracts the tab when the flap is retracted. The rotary actuator 80 takes up and lets out cable as necessary. The initial position of the tab 76 can be either forward-extending or rearward-extending. Appropriate formations can be provided in the wing element 74 to provide a flush or recessed position of the tab 76 when not deployed.

During deployment the tab 76 is forced into position by the air flowing through the slot and the cable acts to hold the tab 76 in the desired position. Due to the action of the air a solid linkage is not necessary for deployment. Other actuator systems employing solid linkages could be used.

While advantageous embodiments have been chosen to illustrate the invention, it will be understood by those skilled in the art that various changes and modifications can be made therein without departing from the scope of the invention as defined in the appended claims.

I claim:

1. A device for enhancing lift of an aircraft wing having a fixed main element which includes a leading edge, a trailing edge, and a cove formed under the trailing edge, and a flap deployable from the trailing edge, the trailing edges of the main element being positionally fixed with respect to the remainder of the main element, the device comprising:

a tab, deployable from the trailing edge of the fixed main element; and means for actuating the tab to move from a non-deployed position to a deployed position in which the tab extends into the cove and towards a leading edge of the flap, whereby the tab forces airflow leaving the trailing edge of the fixed main element to turn towards the flap.

2. A device according the claim 1, wherein the flap tab has a height between 0.5 and 1.0% of a chord length of the main element.

3. A device according to claim 1, wherein the flap tab is nominally perpendicular to a lower surface of the main element when deployed.

4. A device according to claim 1, wherein the flap tab is positioned from the trailing edge of the main element a distance corresponding to about 1.0 to 2.0% of a chord length of the main element.

5. A device according to claim 1, wherein the aircraft wing further comprises a slat element deployable from the leading edge of the main element, and the lift enhancing device further comprises a slat tab deployable from the slat element near a trailing edge thereof and being deployable to an operable position when the slat element is deployed.

6. A device according to claim 5, wherein the flap tab and the slat tab having a height between 0.5 and 1.0% of a chord length of the main element and the slat element, respectively.

7. A device for enhancing lift of an aircraft wing having a fixed main element which includes a leading edge and a trailing edge, and a flap deployable from the trailing edge, the trailing edge of the main element being positionally fixed with respect to the remainder of the main element and defining a cove in conjunction with the flap, the device comprising:

a tab integrally formed on the trailing edge of the main element and being substantially perpendicular to a lower surface of the main element, and extending into the cove and towards a leading edge of the flap, whereby the tab forces airflow leaving the trailing edge of the fixed main element to turn towards the flap.

8. A fixed aircraft wing comprising:

a fixed main element having a leading edge, a trailing edge, and a cove formed under the trailing edge, the trailing edge of the main element being positionally fixed with respect to the remainder of the main element;

a flap deployable from the trailing edge of the fixed main element, the flap having a leading edge and a trailing edge; and a tab deployable from the trailing edge of the fixed main element; and means for actuating the tab to move from a non-deployed position to a deployed position in which the tab extends into the cove and towards the leading edge of the flap, whereby the tab forces airflow leaving the trailing edge of the fixed main element to turn towards the flap.

9. A fixed aircraft wing according to claim 8, wherein the flap tab has a height between 0.5 and 1.0% of a chord length of the main element.

10. A fixed aircraft wing according to claim 8, wherein the flap tab is nominally perpendicular to a lower surface of the main element when deployed.

11. A fixed aircraft wing according to claim 8, wherein the flap tab is positioned from the trailing edge of the main element a distance corresponding to about 1.0 to 2.0% of a chord length of the main element.

12. A fixed wing aircraft according to claim 8, further comprising a slat element deployable from the leading edge of the main element, and a slat tab deployable from the slat element near a trailing edge thereof and being deployable to an operable position when the slat element is deployed.

13. A fixed aircraft wing according to claim 12, wherein the flap tab and the slat tab have a height between 0.5 and 1.0% of a chord length of the main element and the slat element, respectively.

* * * * *